United States Patent
Kusunoki et al.

(10) Patent No.: US 8,265,454 B2
(45) Date of Patent: Sep. 11, 2012

(54) VIDEO/AUDIO PLAYBACK APPARATUS

(75) Inventors: Yoshiaki Kusunoki, Tokyo (JP); Chihiro Morita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 474 days.

(21) Appl. No.: 12/517,587

(22) PCT Filed: Sep. 11, 2007

(86) PCT No.: PCT/JP2007/067640
§ 371 (c)(1),
(2), (4) Date: Jun. 29, 2009

(87) PCT Pub. No.: WO2008/068940
PCT Pub. Date: Jun. 12, 2008

(65) Prior Publication Data
US 2010/0046925 A1    Feb. 25, 2010

(30) Foreign Application Priority Data

Dec. 5, 2006    (JP) .................................. 2006-327919

(51) Int. Cl.
*H04N 9/80*    (2006.01)
(52) U.S. Cl. ........................................................ 386/247
(58) Field of Classification Search .................. None
See application file for complete search history.

(56) References Cited

U.S. PATENT DOCUMENTS

| | | | |
|---|---|---|---|
| 2006/0098936 A1 | 5/2006 | Ikeda et al. | |
| 2006/0098940 A1* | 5/2006 | Seo et al. | 386/46 |
| 2007/0189718 A1 | 8/2007 | Kobayashi et al. | |

FOREIGN PATENT DOCUMENTS

| | | |
|---|---|---|
| EP | 1 688 950 A1 | 8/2006 |
| JP | 2000-207873 A | 7/2000 |
| JP | 2004-240832 A | 8/2004 |
| JP | 2004-272884 A | 9/2004 |
| JP | 2005-159589 A | 6/2005 |
| JP | 2006-33067 A | 2/2006 |
| JP | 2007-294057 A | 11/2007 |
| JP | 2007-299439 A | 11/2007 |
| WO | WO-2004/030356 A1 | 4/2004 |
| WO | WO-2005/052941 A1 | 6/2005 |
| WO | WO 2006/059864 A1 | 6/2006 |
| WO | WO 2006/073247 A1 | 7/2006 |
| WO | WO 2006/074487 A1 | 7/2006 |
| WO | WO-2006/101047 A1 | 9/2006 |
| WO | WO-2007/058025 A1 | 5/2007 |

* cited by examiner

*Primary Examiner* — William C Vaughn, Jr.
*Assistant Examiner* — Daniel Tekle
(74) *Attorney, Agent, or Firm* — Birch, Stewart, Kolasch & Birch, LLP

(57) ABSTRACT

A video/audio playback apparatus that can continue playback even if the external storage means are disconnected during playback, includes a virtual file system section 24 for merging the video/audio information and playback control information of the optical disc 12 with the video/audio information and playback control information of the local storage 7 to configure a virtual file system; a pseudo file system generator 2*a* for generating a pseudo file system 4*a*; a RAM 4 for storing the generated pseudo file system 4*a*; a disconnection detector 2*b* for detecting disconnection of the local storage 7 from the connecting section 15; and a playback manager 21 for causing the virtual file system section 24 to merge the video/audio information and the playback control information of the optical disc 12 with the information of the pseudo file system 4*a* immediately after the disconnection is detected, thereby newly configuring the virtual file system.

7 Claims, 10 Drawing Sheets

VIDEO/AUDIO PLAYBACK APPARATUS

TECHNICAL FIELD

The present invention relates to, for example, a video/audio playback apparatus for reproducing video and audio based on a virtual file system configured by merging the video/audio information and playback control information recorded on an information recording medium such as an optical disc with the video/audio information and playback control information stored in an external storage device.

BACKGROUND ART

Currently, DVD players are generally used for watching/listening to contents dedicated to playback. The DVD players make it possible not only to play back contents from their beginning position but also to perform an interactive operation with users such as a playback from a favorite position, a playback in a favorite order, a change of subtitles and a change of audio languages. However, general DVD players can play back only video contents, subtitle data and audio data that have already been recorded on the loaded disc.

The followings are proposed as improvement schemes for this. For example, the patent document 1 proposes a scheme in which an update audio file downloaded via a network is stored in a local storage built in a player and a file on a disc and a file in the local storage are virtually merged to configure a virtual file system, thereby allowing the player to play back an updated audio file.

Further, there is also the following proposal. For example, the patent document 2 proposes a scheme in which additional update contents downloaded via a network is stored in a local storage built in a player and a file on a disc and a file in the local storage are virtually merged to configure a virtual file system, thereby allowing the player to play back newly added contents.

Patent document 1: Japanese Patent Application Kokai Publication No. 2005-159589 (page 27, FIG. 4)

Patent document 2: Japanese Patent Application Kokai Publication No. 2006-33067 (page 41, FIG. 1)

DISCLOSURE OF THE INVENTION

Problems to be Solved by the Invention

In the schemes disclosed in the above-mentioned patent documents 1 and 2, it is assumed that the local storage is always a built-in one. However, a storage medium usable for the local storage is not limited to a built-in one, but a removable storage medium such as a USB memory, a USB-HDD, a CompactFlash memory card and the like, for example, can be used. In such cases, there may be cases where the local storage is electrically disconnected from the player by user's will or user's carelessness. If the local storage is disconnected while the playback operation is performed according to a virtual file system configured when the disc is loaded, a reference designation of the virtual file system is lost, which may cause an abnormal operation such as a hang-up in the player.

Therefore, the present invention has been made in order to resolve the problems of the above-mentioned conventional art and it is an object of the present invention to provide a video/audio playback apparatus that can continue playback even if an external storage means is electrically disconnected during playback.

Means of Solving the Problem

A video/audio playback apparatus according to the present invention includes: a playback drive section reading first video/audio information and first playback control information from an information recording medium; a connecting section, to which an external storage device storing second video/audio information and second playback control information is electrically connected; a virtual file system section merging the first video/audio information and the first playback control information with the second video/audio information and the second playback control information to virtually configure third video/audio information and third playback control information; an output control section outputting the third video/audio information on the basis of the third playback control information; a pseudo merging information generator generating pseudo merging information which is substitutable for the second video/audio information and the second playback control information; a pseudo merging information storage section storing the generated pseudo merging information; a disconnection detector detecting electrical disconnection of the external storage device from the connecting section; and a playback manager causing the virtual file system section to merge the first video/audio information and the first playback control information with the pseudo merging information stored in the pseudo merging information storage means immediately after when the disconnection detector detects that the external storage device is electrically disconnected, thereby newly configuring the third video/audio information and the third playback control information.

Effects of the Invention

The video/audio playback apparatus according to the present invention has an advantageous effect that it can continue playback even if the external storage means is electrically disconnected during playback.

EXPLANATION OF REFERENCE NUMERALS AND SYMBOLS

1 video/audio playback apparatus; 2 system controller; 2a pseudo file system generator; 2b disconnection detecting means; 3 ROM; 4 RAM; 4a pseudo file system; 5 local storage controller; 6 network controller; 7 local storage; 8 playback drive section; 9 video/audio decoder; 10 video output control section; 11 audio output control section; 12 optical disc; 13 display device, 14 audio output device; 15 connecting section; 20 application; 21 playback manager; 22 application execution section; 23 decode and display-control section; 24 virtual file system section; 25 optical disc file system section; 26 local storage file system section.

BEST MODE FOR CARRYING OUT THE INVENTION

First Embodiment

Figure 1:
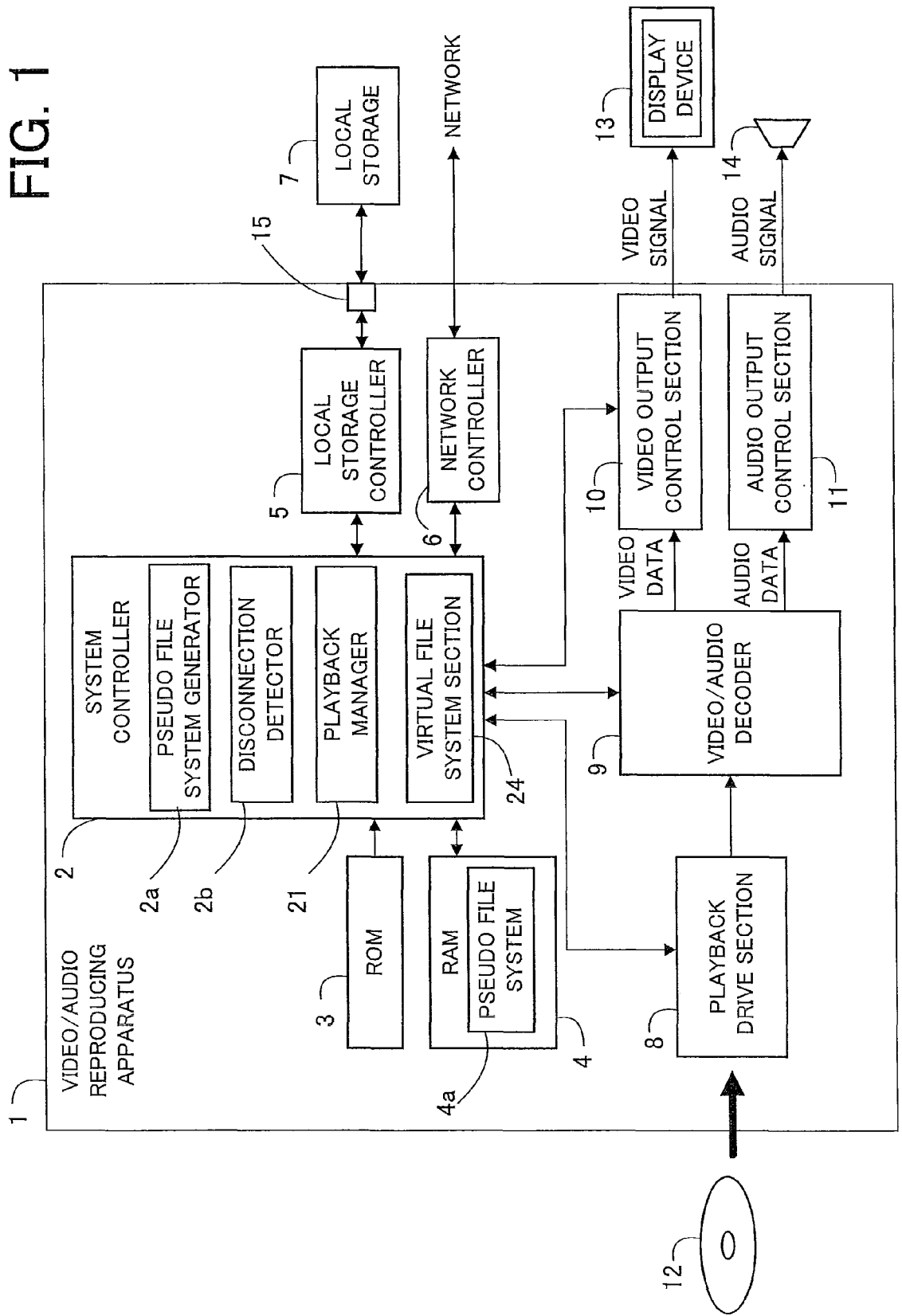
FIG. 1 is a block diagram showing a schematic configuration of a video/audio playback apparatus according to a first embodiment of the present invention, a local storage, an optical disc, a display device, and an audio output device.

FIG. 1 is a block diagram showing a schematic configuration of a video/audio playback apparatus according to a first embodiment of the present invention, a local storage 7 as an example of an external storage device, an optical disc 12 as an example of an information recording medium, a display device such as a liquid crystal monitor, and an audio output device 14 such as a speaker. The information recording medium may be not only an optical disc such as a DVD or a Blu-ray disc but also another medium adopting a different recording method using a magnetic recording disc, a semiconductor memory device or the like.

As shown in FIG. 1, the video/audio playback apparatus 1 includes a system controller 2 for controlling operation of the whole system, a ROM 3, a RAM 4, a local storage controller 5, a network controller 6, a playback drive section 8 for an optical disc 12, a video/audio decoder 9, a video output control section 10, an audio output control section 11, and a connecting section 15, to which the local storage 7 as an external storage device is electrically connected.

The system controller 2 includes a microprocessor (not shown in the figures) for controlling the whole of the video/audio playback apparatus 1. The ROM 3 stores programs and data to be used when the system controller 2 operates. The RAM 4 is used for a work area when the system controller 2 operates, a buffer area during data processing, a storage area of the pseudo file system, and so on.

As shown in FIG. 1, the system controller 2 includes a pseudo file system generator 2a, a disconnection detector 2b, a playback manager 21, and a virtual file system section 24. The disconnection detector 2b may be configured as part of the playback manager 21. The disconnection detector 2b detects disconnection of the local storage 7 from the connecting section 15. The pseudo file system generator 2a generates a pseudo file system as pseudo merging information that can be substituted for the video/audio information and playback control information stored in the local storage 7. The virtual file system section 24 merges the video/audio information and playback control information recorded on the optical disc 12 with the video/audio information and playback control information stored in the local storage 7, thereby virtually configuring a virtual file system that is a single item of video/audio information and playback control information. Immediately after the disconnection detector 2b detects electrical disconnection of the local storage 7 from the connecting section 15, the playback manager 21 merges the video/audio information and playback control information recorded on the disc 12 with the pseudo file system 4a, thereby causing the virtual file system section 24 to newly configure a virtual file system.

After loading the optical disc 12, the playback drive section 8 reads data from the optical disc 12, and sends the read data to the video/audio decoder 9 and the system controller 2 under the control of the system controller 2.

The video/audio decoder 9 separates the video/audio information in a multiplexed state sent from the playback drive section 8 into a video stream, an audio stream and so on, decodes the video stream and audio stream compressed encoded on a predetermined format, sends the decoded video data to the video output control section 10, and sends the decoded audio data to the audio output control section 11. The video output control section 10 converts the received video data to a video signal and sends it to the display device 13. In some cases, the video output control section 10 may perform a synthesis process of the graphics data generated by the system controller 2, a scaling process, and another process in parallel during the conversion to the video signal. The display device 13 displays an image based on the received video signal on its screen. Furthermore, in parallel to this, the audio output control section 11 converts the received audio data to the audio signal and sends it to the audio output device 14. The audio output device 14 outputs a sound based on the received audio signal.

The local storage 7 is connected to the system controller 2 through the connecting section 15 and the local storage controller 6. The local storage 7 is attachable and removable (can be electrically connected and disconnected). The connecting section 15 between the local storage 7 and the local storage controller 6 may be any one based on a hot-plug, for example, a serial bus such as a USB and an IEEE1394, a PC card, and a CompactFlash. The system controller 2 can read data from the local storage 7 and write data in the local storage 7 by accessing the local storage 7 through the local storage controller 5. In first embodiment, the local storage 7 is a USB memory.

Further, the disconnection detector 2b of the system controller 2 quickly detects connection or disconnection of the local storage 7 by the interruption, the state polling, or the like.

Furthermore, the system controller 2 is connected to the network controller 6, and can be connected to a network such as the internet through this. The system controller 2 can download the update data from the server, not shown, through the network. Moreover, any system including a wired LAN such as IEEE 802.3, a wireless LAN such as IEEE 802.11a/b/g, and the like may be adopted as a network system. In addition, there may be cases where the video/audio playback apparatus 1 does not include the network controller 6 and does not connect to the network directly.

Figure 2:
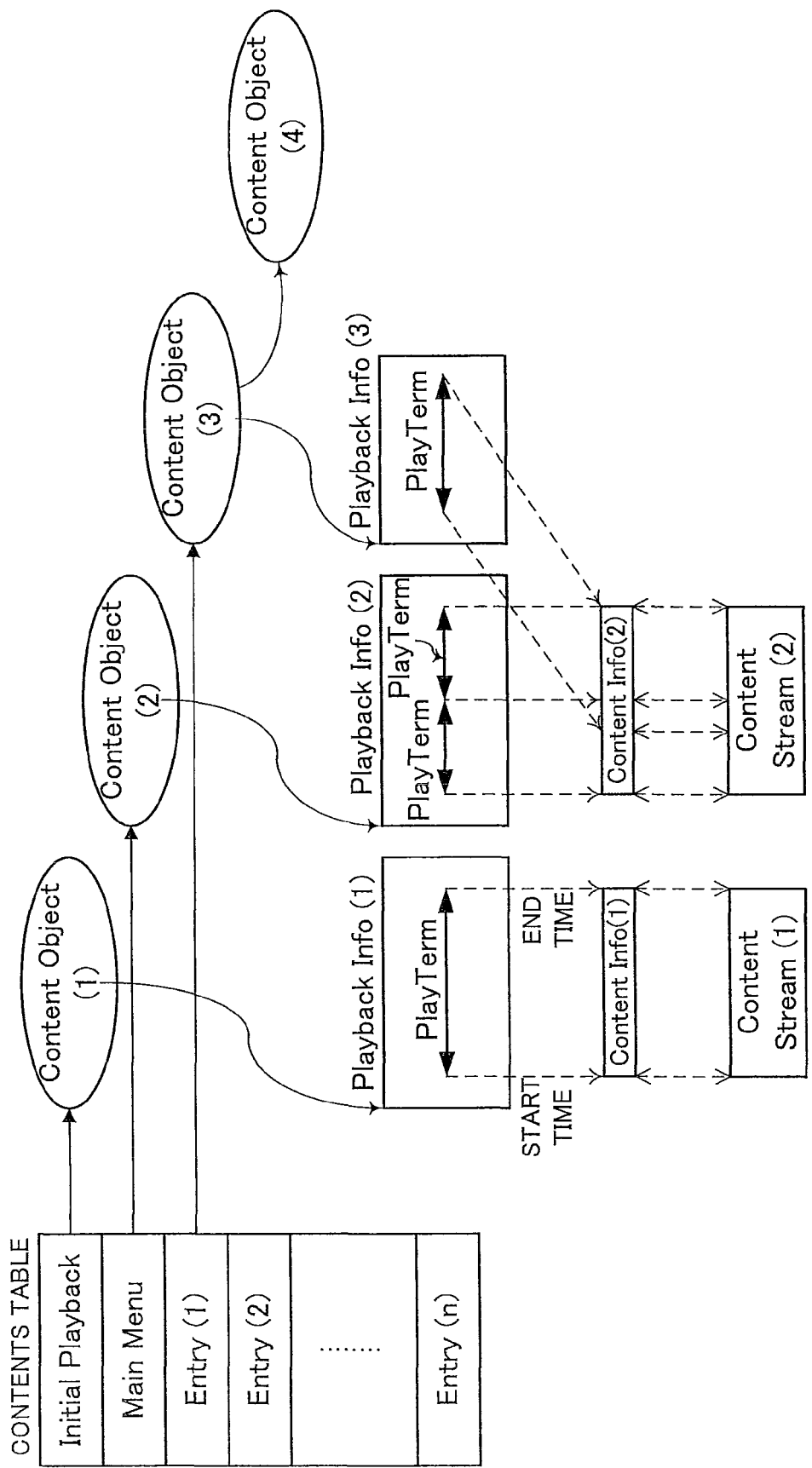
FIG. 2 is a diagram showing a logical structure of contents recorded on an optical disc to be played back in the video/audio playback apparatus according to the first embodiment.

FIG. 2 is a diagram showing a logical structure of contents recorded on an optical disc 12 to be played back on the video/audio playback apparatus 1 according to the first embodiment. This structure includes a contents table as top level information. When the optical disc 12 is loaded in the video/audio playback apparatus 1, the contents table includes Initial Playback (an initial playback) as an element indicating a picture to be played back initially (an initial playback picture), Main Menu (a main menu) as an element indicating a main menu screen, and Entry (an entry) as an element indicating each title of the programs. Each element includes information regarding the initial playback picture, the main menu screen, or an entry point to a program corresponding to each title. The Content Object (a contents object) is a program including and interactive command for implementing an interactive playback. Each Content Object is referenced to by each element of the contents table. The video/audio playback apparatus 1 can invoke the Content Object by searching the contents table. The interactive command of the Content Object is a command for causing the playback start based on the Playback Info (playback information) (e.g., the interactive command of the Content Object (1) in FIG. 2 causes the playback start based on the Playback Info (1).) or for causing the startup of another Content Object (e.g., the interactive command of the Content Object (3) in FIG. 2 causes the startup of the Content Object (4).).

The Playback Info is information for indicating a playback method of contents, and includes one or a plurality of Play Terms (play terms) that is information indicating a section to be played back in the stream data of actual contents. The Play Term includes two items of information that are a start time and an end time of the section to be played back in a time series of the stream data. The stream data of the actual contents are shown as Content Stream (a content stream) in FIG. 2. The Content Stream includes, for example, multiplexed video and audio data in MPEG2-TS (Moving Picture Experts Group 2-Transport Stream) format. Since this stream data are recorded on the optical disc 12 as a file of byte string, it is difficult to read it as it is, on the basis of the playback time period. For this reason, the Content Info file indicating a corresponding relationship between time information such as a start time and an end time and reference information (address information) of an actual stream data file is used.

Referring to FIG. 2, the Playback Info (1) includes a single Play Term, and this Play Term makes a reference to the whole of the Content Stream (1) that is one item of the actual stream data via the Content Info (1) file. Further, the Playback Info (2) includes two Play Terms, and each of the Play Terms makes a reference to the first half and the latter half of the Content Stream (2) that is one of the actual stream data via the Content Info (2) file. Furthermore, the Playback Info (3) includes a single Play Term, and this Play Term makes a reference to part of the Content Stream (2) that is one of the actual stream data via the Content Info (2) file.

Figure 3:
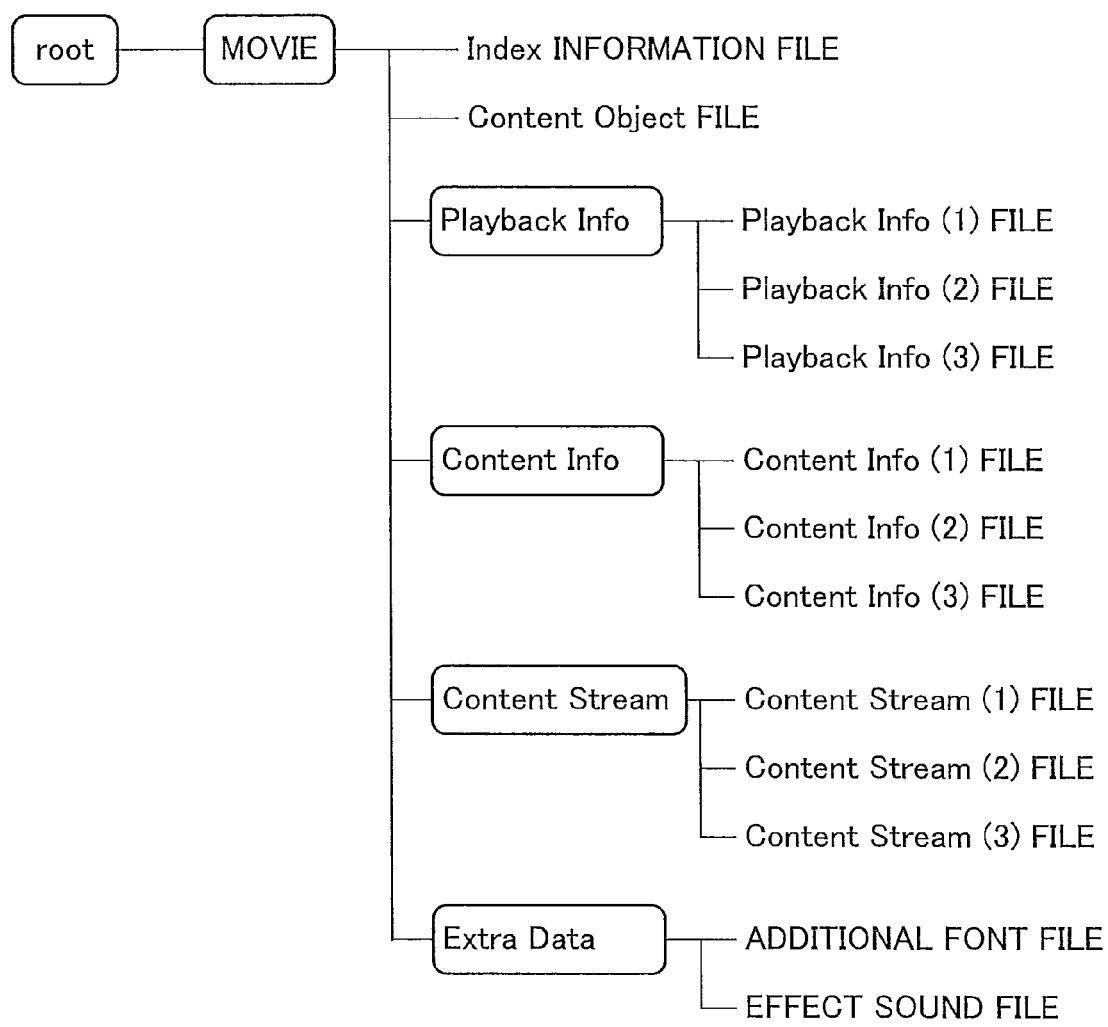
FIG. 3 is a diagram showing an example of a file system structure for implementing the logical structure of contents recorded on the optical disc to be played back in the video/audio playback apparatus according to the first embodiment.

FIG. 3 is a diagram showing an example of a file system structure for implementing a logical structure of the contents shown in FIG. 2. As shown in FIG. 3, in this file system, a "MOVIE" directory is stored under the "root" directory. Under the "MOVIE" directory an Index (index) information file, a Content Object (content object) file, a "Playback Info" directory, a "Content Info" directory, a "Content Stream" directory, and an "Extra Data" directory are stored.

The Index information file is an information file including the contents table, and a single optical disc is only one Index information file. The video/audio playback apparatus 1 causes to display a playback menu screen of contents included in the optical disc 12 according to information of this Index information file. The Content Object referenced to by the relevant element of the Index information file is implemented according to an item selected from the menu screen by user's input operation in an operating part such as a remote controller (not shown). The Content Object file is a file including all Content Objects. The video/audio playback apparatus 1 can start a playback based on the Playback Info and start another Content Object by implementing the Content Object on the basis of information of the Index information file according to a state based on the user operation and the like.

The "Playback Info" directory includes one or a plurality of Playback Info files under it. The Content Object invokes necessary Playback Info from it and uses it for a playback of the contents.

The "Content Info" directory includes one or a plurality of Content Info files under it.

The "Content Stream" directory includes one or a plurality of Content Stream files under it. As has been described above, since the Content Stream file is a stream data file of the actual contents, and the Content Info file is an information file indicating the corresponding relationship between the time information such as a start time and an end time and the reference information (address information) of the actual stream data file, the Content Info files and the Content Stream files have one-to-one correspondence.

The "Extra Data" directory is a directory for storing additive data other than the contents. In the example of FIG. 3, an additional font file used for subtitles and an effect sound file used for producing an alarm sound in reply to the user operation are stored.

Figure 4:
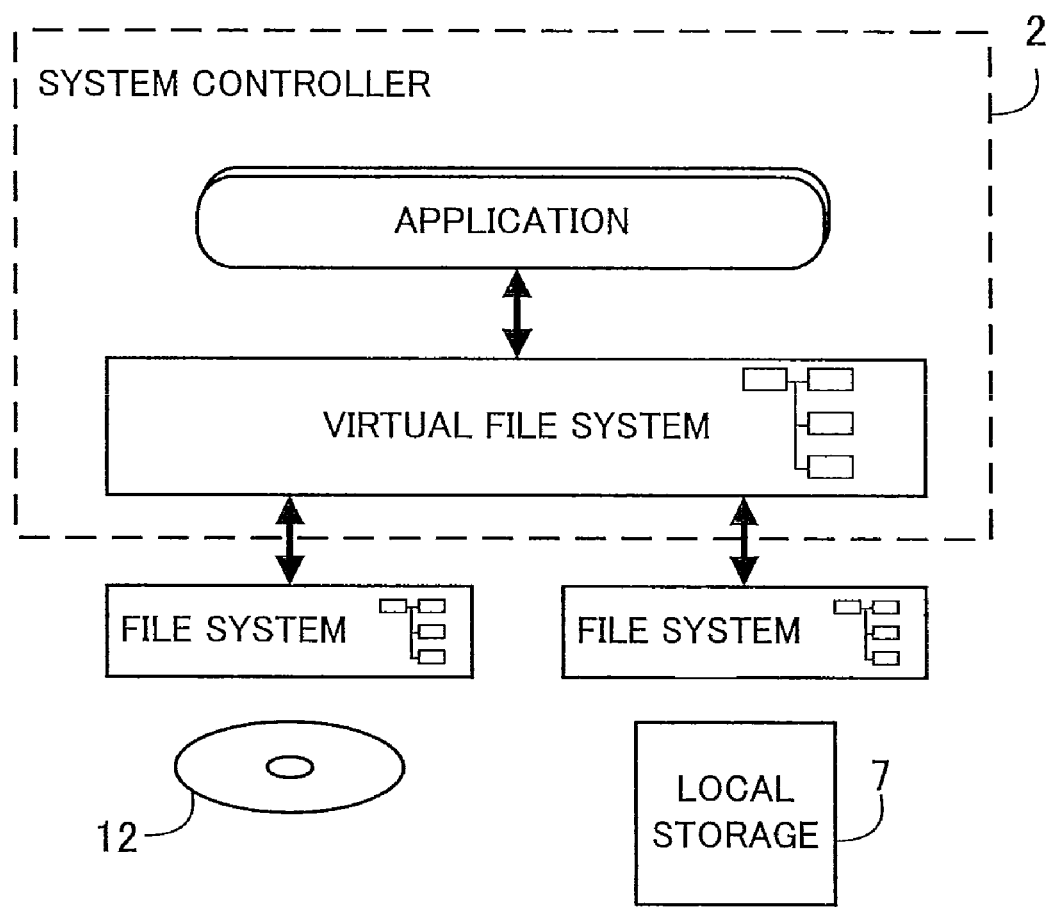
FIG. 4 is an explanatory diagram showing a concept of the virtual file system used in a system controller of the video/audio playback apparatus according to the first embodiment.

FIG. 4 is an explanatory diagram showing a concept of the virtual file system used in the system controller 2 of the video/audio playback apparatus 1 according to the first embodiment. In order to form data by adding (merging) the contents included in the optical disc 12 and the contents stored in the local storage 7, a virtual file system is used. When a file system in the optical disc 12 or a file system in the local storage 7 is accessed through the application implemented in the system controller 2 provided in the video/audio playback apparatus 1, a direct access to each file system is not executed and an access via the virtual file system is executed.

Figure 5:
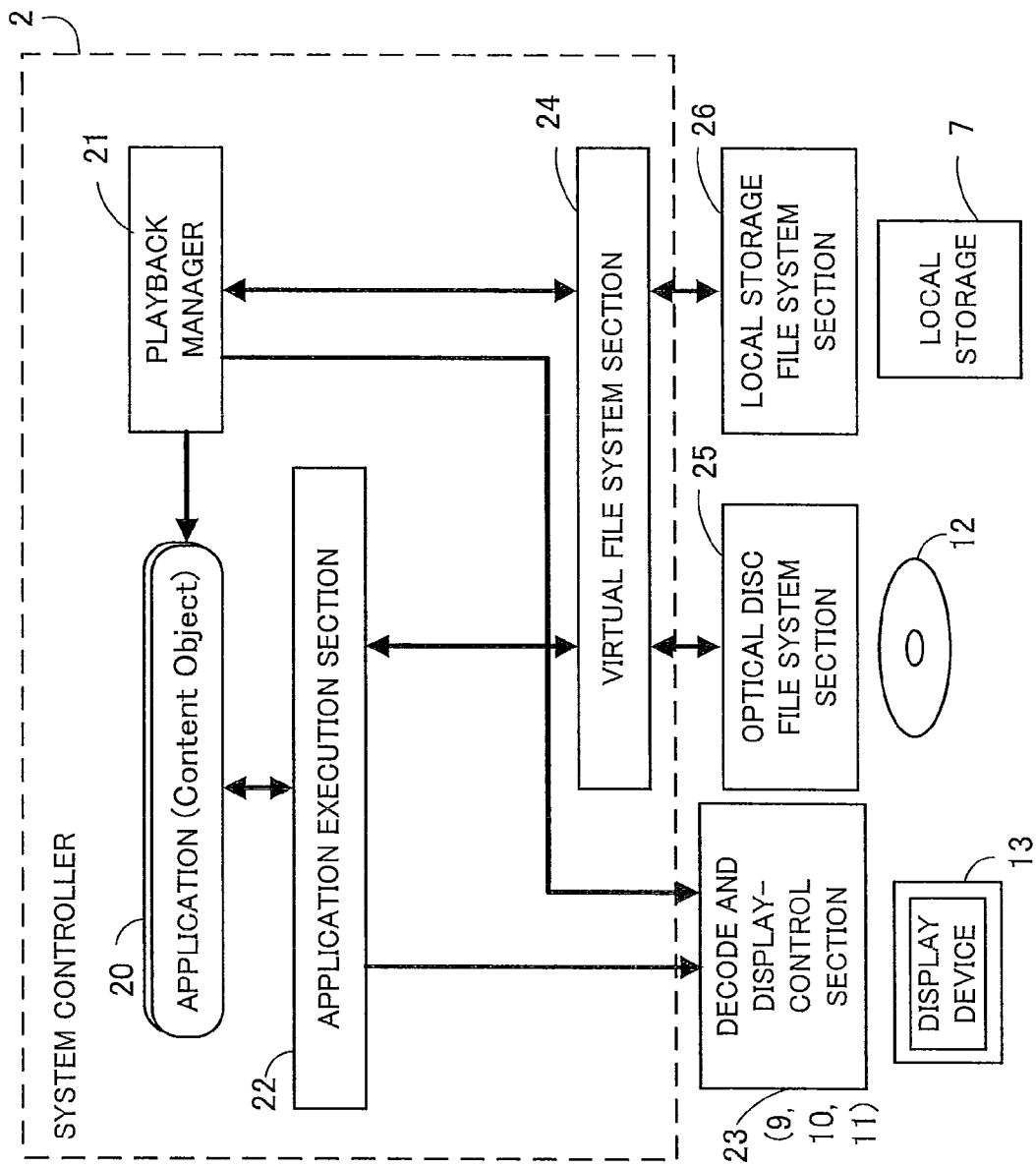
FIG. 5 is a functional block diagram of a system controller of a video/audio playback apparatus according to the first embodiment.

FIG. 5 is a functional block diagram of the system controller 2 of the video/audio playback apparatus 1 according to the first embodiment. Each functional block shown in FIG. 5 is implemented by executing a control software stored in the ROM 3 in advance by the system controller 2. The playback manager 21 is a block for controlling a playback sequence, and performs processing as the corresponding application such as start-up, stop, and switching of the Content Object in accordance with the user operation and the like, with reference to the contents table of FIG. 2. The application 20 is executed on the application execution section 22, reads data of the contents from the optical disc file system section 25 or the local storage file system section 26 through the virtual file system section 24 on the basis of the Playback Info of FIG. 2, and sends the data to the decode and display-control section 23. The decode and display-control section 23 (corresponding to the video/audio decoder 9, the video output control section 10, and the audio output control section 11 in FIG. 1) decodes the data of the received contents, and outputs a video signal to the display device 13 and an audio signal to the audio output device 14. The virtual file system section 24 controls the optical disc file system section 25 and the local storage file system section 26 to enable the application to read and write the data of both file systems in the merged state. The process of merging of the file systems is executed according to commands from the playback manager 21.

Figure 6:
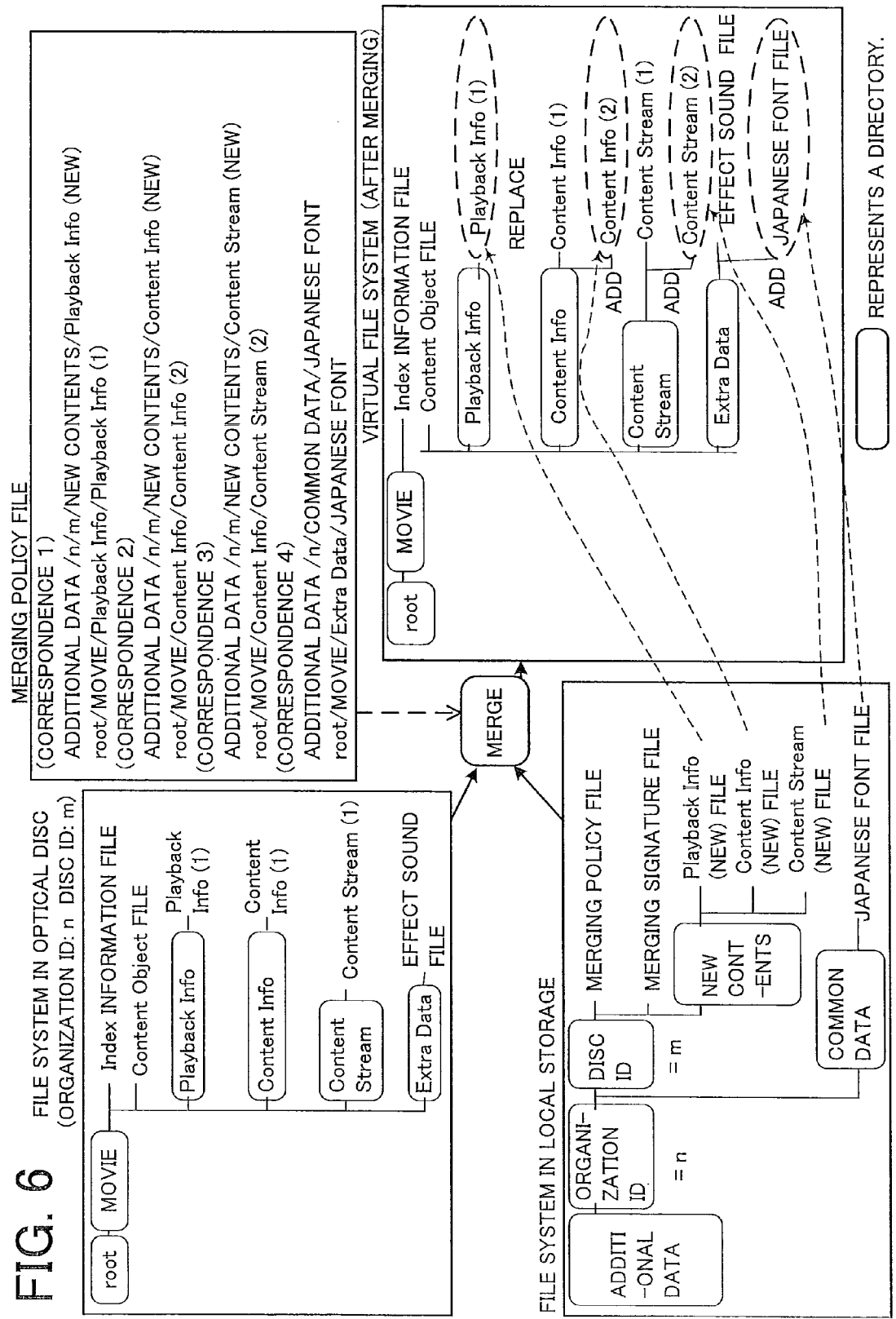
FIG. 6 is an explanatory diagram showing an example of a process of configuring a virtual file system from a file system on an optical disc and a file system on a local storage.

FIG. 6 is an explanatory diagram showing an example of a process of configuring a virtual file system from a file system in the optical disc 12 and a file system in the local storage 7 in the video/audio playback apparatus 1 of the first embodiment.

A file system structure in the optical disc 12 is in conformance with the format shown in FIG. 3. Further, two items of information, i.e., an "organization ID" for identifying a manufacturer that manufactures this disc and a "disc ID" for distinguishing discs on the basis of the details (title) of the contents are written in the optical disc, and they can be read by the software operating on the system controller 2. The "organization ID" must be globally unique, and the "disc ID" must be unique in discs having the same "organization ID". In this example, for convenience' sake, the "organization ID" is represented by n and the "disc ID" is represented by m.

The file systems in the local storage 7 are as follows. The "organization ID" directory corresponding to the "organization ID" of an optical disc 12 is stored in the "additional data" directory as a top directory of the data to be added. If the additional data of discs manufactured by a plurality of organizations are stored in the local storage 7, the number of the directories corresponds to the number of the corresponding organization. The "disc ID" directory corresponding to the "disc ID" of the optical disc 12 is stored under the "organization ID" directory. If the additional data of a plurality of optical discs 12 manufactured by the same organization are stored in the local storage 7, the number of the directories corresponds to the number of the corresponding optical discs 12. The "new contents" directory is stored under the "disc ID" directory, and a file corresponding to the contents to be added is stored under it.

In this example, they are Playback Info (new) files as new Playback Info, Content Info (new) files as new Content Info, and Content Stream (new) files as new Content Streams.

Further, a merging policy file and a merging signature file are stored under the "disc ID" directory. The merging policy file specifies a policy used when a virtual file system is formed from a file system in the optical disc 12 and a file system in the local storage 7. This file includes a file name having path information in the local storage 7 and a correspondence list of file names having path information on the virtual file system.

The merging signature file is a file for certifying authenticity of the merging policy file, and is a file including an electric signature in its inside. The video/audio playback apparatus 1 configures a virtual file system using only merging policy files that can be authenticated by the merging signature file. The "common data" directory is included under the "organization ID" directory. The commonly usable data throughout discs that have different titles and are manufactured by the same organization are stored under the "common data" directory. In this example, a Japanese font file is stored.

If, in the file system in the local storage 7, there is no merging policy file under a directory corresponding to the "organization ID" and "disc ID" of the optical disc 12 loaded into the video/audio playback apparatus 1, the video/audio playback apparatus 1 reflects the contents of the file system in the optical disc 12, as it is, in the contents of the virtual file system. In other words, the application can read the contents of the file system in the optical disc 12 through the virtual file system. If there is a merging policy file in the local storage 7, after confirming the merging policy file in the merging authenticity signature file, the video/audio playback apparatus 1 merges the contents of the file system in the optical disc 12 and the contents of the file system in the local storage 7 on the basis of a file name including path information in the local storage 7 described in the merging policy file and a correspondence list of the file names including the path information on the virtual file system to configure the contents of the virtual file system. In an example shown in FIG. 6, four items of Correspondence information (Correspondence 1 to 4) are described in the merging policy file. The contents of this file indicate concepts, the description format of the actual merging policy file may be, for example, an XML (extended Markup Language), a unique description method using the text, or a unique binary format.

The merging policy files in FIG. 6 indicate relationships of the files in each "Correspondence". In each of "Correspondence 1" to "Correspondence 4" in the merging policy file, the first line indicates a file name including path information in the local storage 7 and the second line indicates a file name including path information on the virtual file system.

The video/audio playback apparatus 1 first merges an "additional data/n/m/new contents/Playback Info (new) file" in a file system in the local storage 7 on the basis of information of "Correspondence 1" in the merging policy file so that it can be read as a "root/MOVIE/Playback Info/Playback Info (1) file" on the virtual file system. In this case, since there has already been the "root/MOVIE/Playback Info/Playback Info (1) file" in the file system in the optical disc 12, the "root/MOVIE/Playback Info/Playback Info (1) file" in the optical disc is replaced by the "additional data/n/m/new contents/Playback Info (new) file" in the local storage 7.

Next, the "additional data/n/m/new contents/Content Info (new) file" in a file system in the local storage 7 is merged on the basis of the information of "Correspondence 2" so that it can be read as a "root/MOVIE/Content Info/Content Info (2) file" on the virtual file system. In this case, there is no file having the same name in the file system in the optical disc 12, the "additional data/n/m/new contents/Content Info (new) file" in the local storage 7 is added as a new Content Info (2) file.

Similarly, the "additional data/n/m/new contents/Content Stream (new) file" in the file system in the local storage 7 is merged on the basis of the information of "Correspondence 3" so that it can be read as a "root/MOVIE/Content Info/Content Stream (2) file" on the virtual file system. In this case, since there is no file having the same name in the file system in the optical disc 12, the "additional data/n/m/new contents/Content Stream (new) file" in the local storage 7 is added as a new Content Stream (2) file.

Further, the "additional data/n/common data/Japanese font file" in the file system in the local storage 7 is merged on the basis of the information of "Correspondence 4" so that it can be read as a "root/MOVIE/Extra Data/Japanese font file" on the virtual file system. In this case, since there is no file having the same name in the file system in the optical disc 12, the "additional data/n/common data/Japanese font file" in the local storage 7 is added as a new Japanese font file.

As a result of the above operation, the application can read contents that are obtained by updating the contents of the file system in the optical disc 12 through the virtual file system using the contents of the file system in the local storage 7. In the above example, it is a case where the new contents and Japanese font are added to the original optical disc 12, and the Playback Info is changed according to it.

In the example using the above-described virtual file system, when the local storage 7 is attachable and removable as described in FIG. 1, there may be cases where the local storage 7 is disconnected from the video/audio playback apparatus 1 due to carelessness or the like during watching/listening to the contents of the optical disc 12 loaded in the video/audio playback apparatus 1, after the user electrically connects the local storage 7 to the connecting section 15 and starts up the video/audio playback apparatus 1, or the user starts up the video/audio playback apparatus 1 and thereafter the local storage 7 is connected to the connecting section 15. In this case, when the playback is continued using the information recorded in the local storage 7, there is very high probability of a hang-up of the apparatus, because it tries to read the file information that does not exist. In order to avoid this, it is preferable that the playback be continued after replacing a file depending on the local storage 7 of the virtual file system formed by merging contents of the optical disc 12 and the local storage 7 with a file whose reference information is correct and exists.

In general, a file in the virtual file system that makes a reference to the local storage 7 is configured according to the merging policy file, but in this example, a replaceable pseudo file system is prepared in advance in case that the local storage 7 is disconnected unexpectedly, and immediate replacement of the pseudo file system is performed. This pseudo file system is an alternative file group that is replaceable with a file involved in the local storage 7, and this pseudo file system has a feature that a reference designation does not indicate the local storage. On the other hand, since the pseudo file system is generated in the RAM 4, its size is restricted. Therefore, the playback control information to be generated and forming the pseudo file system has the minimum time length, the playback control information is configured so that the contents being now played back in normal playback state is stopped immediately even if the playback is continued after switching from the original virtual file system to this pseudo file system.

The pseudo file system is formed in the RAM 4 as a file having the same name as that of the local storage, and, if they are a Content Stream, the pseudo file system has the same format as that recorded in the local storage and its playback time length is 0 or minimum. Further, depending on the capacity of the RAM 4, a playback time length may be shorter than a playback time length of the actual Content Stream. On the other hand, regarding a file on which the stream information and navigation information such as the Playback Info and the Content Info are recorded, both reference information (e.g., the number of the Content Info to be referenced and the file name that should be described in the Playback Info) coincides with those of the original file, and/or the navigation command to be executed is embedded in the relevant Playback Info before or after the playback of the Content Stream. Furthermore, by setting the minimum start time and the end time to the same values so as to make the playback time period to be the shortened Content Stream, the reference information is generated so that the Content Stream pseudoly generated in the RAM 4 is referenced.

Figure 7:
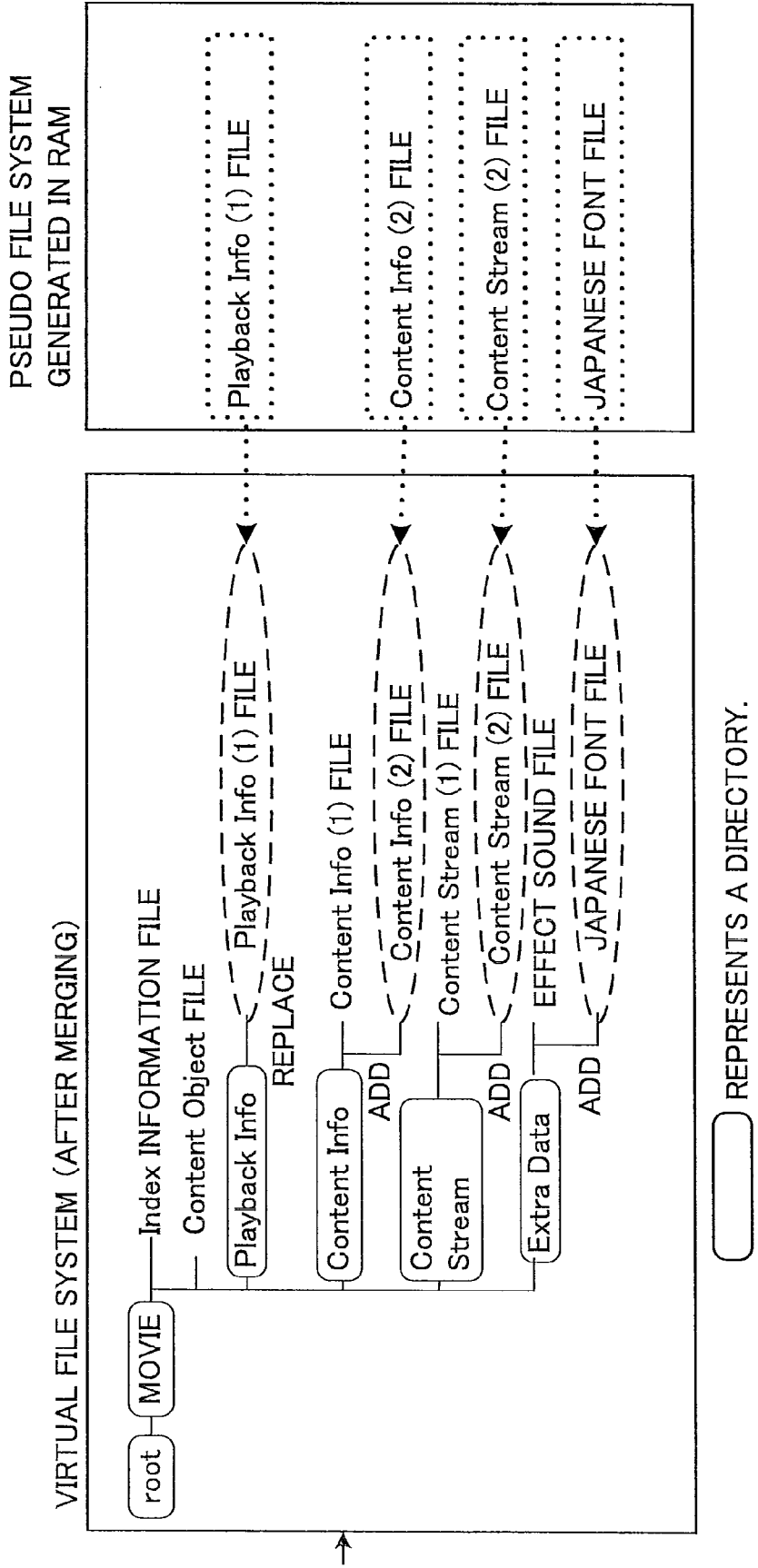
FIG. 7 is an explanatory diagram conceptually showing a virtual file system formed using a pseudo file system when a local storage is disconnected from the video/audio playback apparatus according to the first embodiment.

FIG. 7 is an explanatory diagram conceptually showing a virtual file system formed using a pseudo file system when the local storage 7 is disconnected from the video/audio playback apparatus 1 according to the first embodiment. Referring to FIG. 6, the backups of the Playback Info (1) file, the Content Info (2) file, the Content Stream (2) file, and the Japanese font file, that are merged in the virtual file system from the local storage 7, are performed to generate the backups having the same names in the RAM 4.

Figure 8:
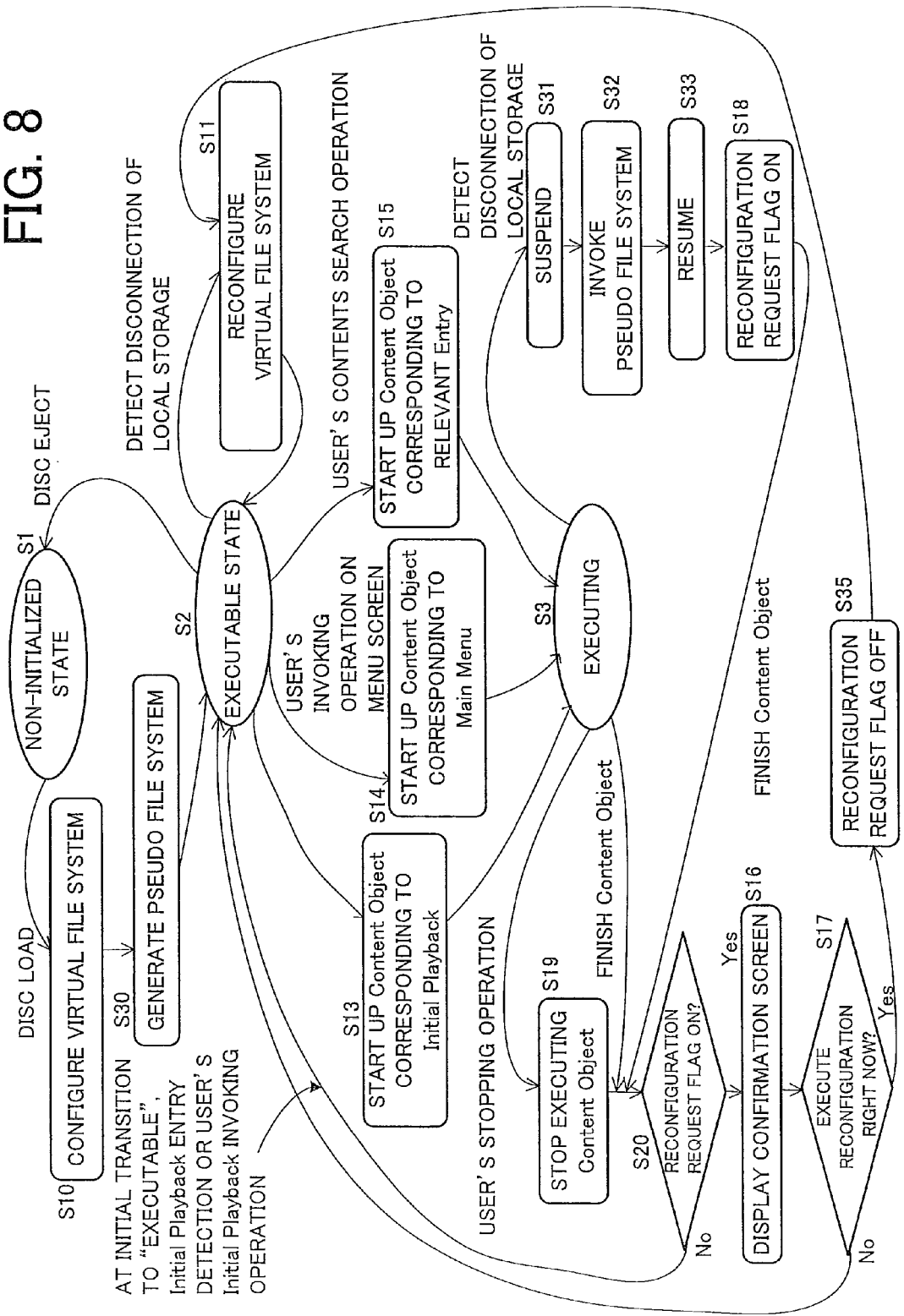
FIG. 8 is a diagram showing an example of a state transition in the video/audio playback apparatus according to the first embodiment.

FIG. 8 is a diagram showing an example of a state transition of the video/audio playback apparatus 1 according to the first embodiment. A state immediately after the power of the video/audio playback apparatus 1 is turned on is shown as step S1 and is a "non-initialized state". At this time, if the user loads an optical disc 12 in the video/audio playback apparatus 1, the playback manager 21 issues a command for configuring a virtual file system to the virtual file system section 24, and a state transition to step S10 takes place. At step S10, the virtual file system section 24 searches for a merging policy file in the local storage 7, if the merging policy file is found out, the virtual file system is configured in a method described in FIG. 4. Next, a state transition to step S30 takes place, the pseudo file system generator 2a generates a pseudo file system and stores it in the RAM 4. Next, a state of the video/audio playback apparatus 1 is shown at step S2 and a state transition to an "executable state" takes place. If at a time of step S10 the local storage 7 is not connected to the video/audio playback apparatus 1, the virtual file system section 24 configures a virtual file system from only contents of the file system of the optical disc 12, and a state transition to step S2 takes place. After that, a description will be made as to a case where at a time of step S10 the local storage 7 is connected to the video/audio playback apparatus 1.

In a state of step S2, the playback manager 21 has already been able to start up the application 20. In this state, if the local storage 7 is disconnected from the video/audio playback apparatus 1 unexpectedly, the playback manager 21 detects disconnection of the local storage 7 through a hot plug system provided in the local storage controller 5 and the local storage 7. This means may utilize an interruption scheme or a polling scheme in which a periodic state monitor is performed. When the playback manager 21 detects disconnection of the local storage 7, it issues a reconfiguration command of a virtual file system to the virtual file system section 24, a transition to step S11 takes place. Even if at step S11 the virtual file system section 24 searches for a merging policy file in the local storage 7, the merging policy file cannot be found out. Therefore, it is reconfigured so as to form the virtual file system including only contents of the optical disc 12. The state of the video/audio playback apparatus 1 is shown at step S2 and still an "executable state". Hereafter, the application 20 can read data configured by only the file system in the optical disc 12.

Hereafter, a description will be made on the assumption that in a state of step S2, the local storage 7 has been already connected to the video/audio playback apparatus 1. If the elements of the Initial Playback are determined to be effective when the contents table is referenced to, in compliance with this the playback manager 21 starts up the corresponding application (Content Object) (step S13). As a result, a transition of the state of the video/audio playback apparatus 1 to "executing" at step S3 takes place. The other Conditions for effecting a transition from step S2 to step S3 are a case where in compliance with the user's invoking operation on the menu screen, when the playback manager 21 makes a reference to the contents table and the elements of the Main Manu is effective, it starts up the corresponding application (Content Object) on the basis of the referenced content (step S14); a case where in compliance with the user's contents search operation, the playback manager 21 makes a reference to the contents table and the element of the relevant Entry is effective, it starts up the corresponding application (Content Object) on the basis of the referenced content (step S15); a case where in compliance with the user's Initial Playback invoking operation, when the playback manager 21 makes a reference to the contents table and the element of the Initial Playback is effective, it starts up the corresponding application (Content Object) on the basis of the referenced content (step S13); and so on.

A description will be made as to a case where the specific content (Content Object) recorded in the local storage 7 is being played back in compliance with the user's operation. In this state, if the local storage 7 is electrically unexpectedly disconnected from the connecting section 15 of the video/audio playback apparatus 1, the playback manager 21 detects disconnection of the local storage 7 through a hot plug structure provided in the local storage controller 5 and the local storage 7. At step S31, an entry of the contents being played back now is made, that is, the Content Object number, the Play Term information, and the playback time information are collected and these information is stored in, for example, the RAM 4 (suspend). Further, at step S32, a file for configuring the virtual file system that makes a reference to the information in the local storage 7 is replaced with a pseudo file system prepared in the RAM 4 in advance. Next, at step S18, a "reconfiguration request flag" is switched to ON, and at step S33, when the file of the operating program (not shown specifically) of the video/audio playback apparatus, which existed in the local storage 7, is invoked to a work area in the RAM 4, the file that was stored in the local storage 7 is deleted from the RAM 4 temporarily and a file generated for backup in the RAM 4, that is indicated by the pseudo file system, is expanded again on the work area in the RAM 4. Furthermore, a reference position of a file indicated by the pseudo file system newly expanded on the work area from the information obtained by the suspending at step S31 is set again. Moreover, the playback state is continued (resume) on the basis of the entry information held at step S31. At this time, although the backups of the Content Object and Play Term are performed and are the same, the next playback control information is configured so as to indicate an end of the file, and therefore the playback of the contents being played back is stopped.

Figure 9:
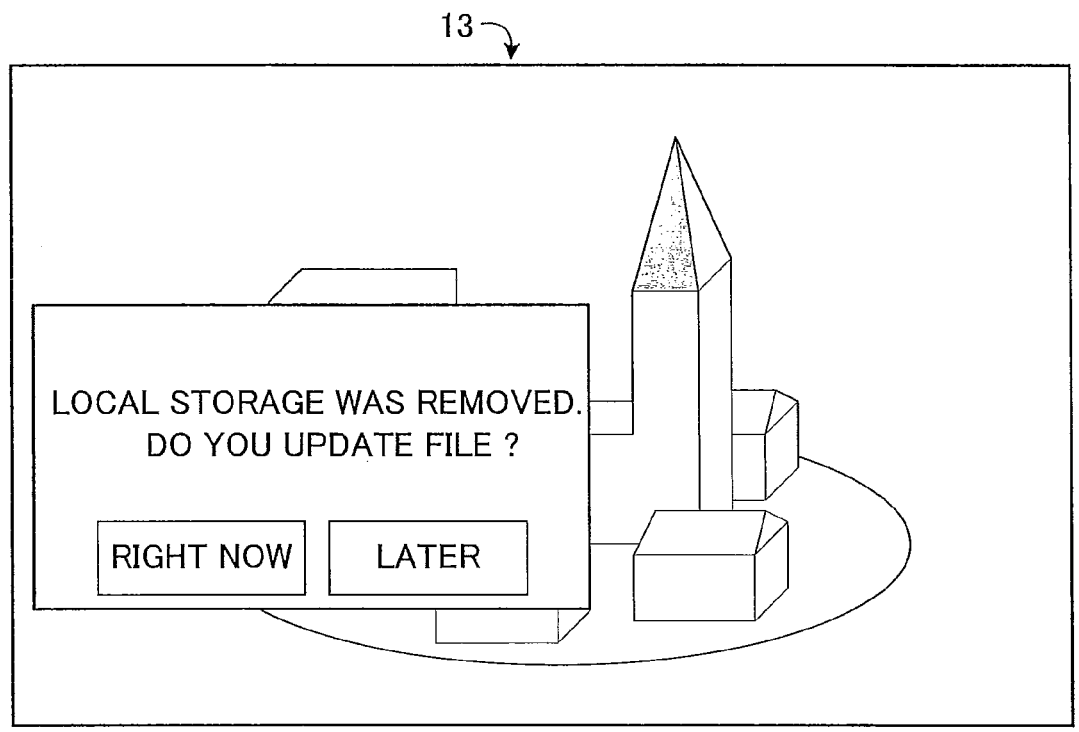
FIG. 9 is a diagram showing an example of a GUI picture when a local storage is connected to the video/audio playback apparatus according to the first embodiment.

Next, the reconfiguration request flag of the virtual file system is checked (step S20), and if it is ON, the playback manager 21 encourages the user an update of the virtual file system through the decode and display-control section and displays a message for causing him/her to select the execution on the display device. FIG. 9 is a diagram showing an example of a GUI picture when a local storage is connected to the video/audio playback apparatus 1 according to the first embodiment, and the display style in this example is a pop-up menu. The user selects an update-right-now or an update-later by an input means such as a remote controller. The playback manager 21 determines the user's selection at step S17, and if the user selects "execute right now", a "reconfiguration request flag" is turned to OFF (step S35), the reconfiguration command virtual file system is issued to the virtual file system section 24, and a transition to step S11 takes place. At step S11, the virtual file system section 24 reconfigures the virtual file system using the above-described method, a state transition of the video/audio playback apparatus 1 to step S2 takes place.

As a result, after this, the playback is continued using a new virtual file system which causes the application 20 to exclude the local storage 7 from the file system in the optical disc 12. Further, when determining that the user selects an update "to be executed later" at step S17, the playback manager 21 holds the "reconfiguration request flag" ON. On the other hand, when the user inputs the stopping operation at a state of step S3, the playback manager 21 stops executing the application 20 (Content Object) in progress at step S19 and determines a state of the "reconfiguration request flag" at step S20. When the "reconfiguration request flag" is OFF, it is not necessary to reconfigure the virtual file system and a transition to "executable state" at step S2 takes place with executing nothing. When the "reconfiguration request flag" is ON, the playback manager 21 issues the reconfiguration command of the virtual file system to the virtual file system section 24 and a transition to step S11 takes place. At step S18, the virtual file system section 24 reconfigures the virtual file system in the above-described method, and a state transition of the video/audio playback apparatus 1 to step S2 takes place. As a result, after this, the application 20 can continue executing the playback using the virtual file system configured by only the file system in the optical disc 12.

By using the above-described processing, even if, when the video/audio playback apparatus 1, to which the removable local storage 7 is connected in advance, loads the optical disc 12 in itself and is in a playback or a halt period, the removable local storage is disconnected and a reference designation file of the virtual file system of the local storage 7 is lost suddenly in response to the disconnection of the removable local storage 7, the video/audio playback apparatus can continue playback without a hang-up by replacing it with the pseudo file system prepared in advance for the local storage, although it cannot play back the contents recorded in the local storage 7.

Further, since the pseudo file system is prepared in advance, quick switching to the pseudo file system 4a is possible when the disconnection of the local storage 7 is detected.

Furthermore, since the apparatus can resume the playback from the held playback state after it holds the information of the playback state and performs the replacement using the pseudo file system 4a when the disconnection of the local storage 7 is detected, as long as the playback contents is data in the local storage 7 when the local storage 7 is disconnected, although the playback is interrupted, the next contents can be played back because a navigation command after the contents playback can be stored in the pseudo file system 4a.

Moreover, since a file generated as the pseudo file system 4a has a playback time period of 0 or a minimum time length, the data size of the stream itself can be made small. Further, regarding the navigation data of the stream, since a map indicating the relationship between the playback time period and the data address position can be made small, the navigation data can also be made small size. Therefore, the backup data is small size data, can be configured easily, and its storage location can be set easily.

In addition, although the pseudo file system is generated for all files in the local storage 7 that are referenced to at start-up in the first embodiment, if the requirement is only the unintentional disconnection of the local storage 7, it is enough to generate the pseudo file of a file regarding the playback required Content Object and a file in the local storage 7 or a file involved in the local storage 7 every time the designated Content Object is played back.

Second Embodiment

The video/audio playback apparatus according to a second embodiment of the present invention is different from the video/audio playback apparatus according to the first embodiment in a respect that a storage capacity of the RAM 4 is enough larger than a storage capacity of the local storage 7. In the second embodiment, it is not necessary to restrict the playback control information to a minimum time length as in the first embodiment due to a problem of the capacity of the pseudo file system. Therefore, in the second embodiment, since the capacity of the RAM 4 is large, the backup of all data in the local storage 7 is performed. A unit of the backup is all data recorded in the local storage 7, or, only a file required in accordance with the merging policy file. Further, the pseudo file system may be stored in the RAM 4 for each unit of the Content Object to be played back. Except for this respect, the video/audio playback apparatus according to the second embodiment is the same as the video/audio playback apparatus according to the first embodiment. Therefore, in the description of the second embodiment, references will also be made to FIG. 1 to FIG. 9.

Figure 10:
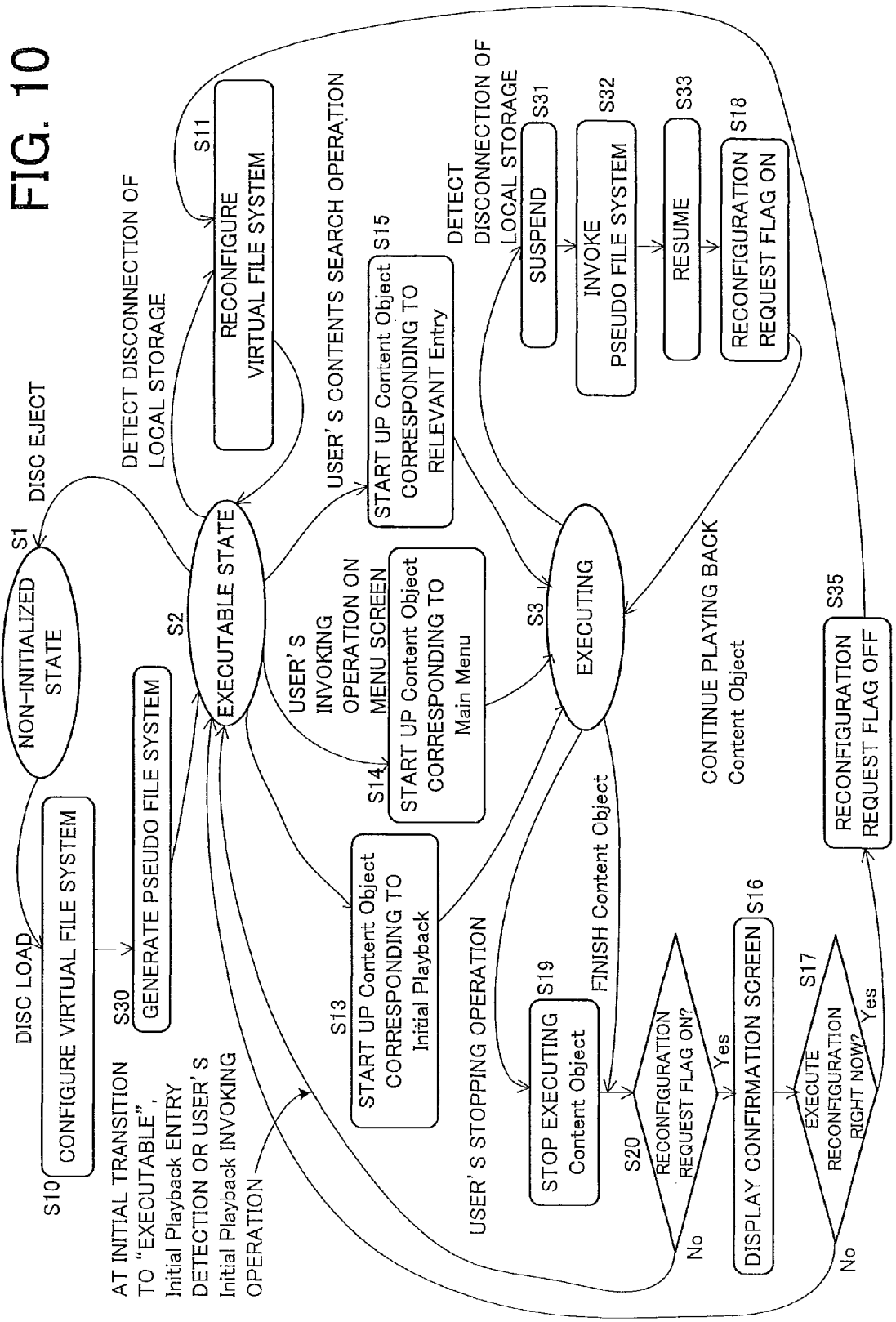
FIG. 10 is a diagram showing an example of a state transition in a video/audio playback apparatus according to a second embodiment of the present invention.

FIG. 10 is a diagram showing an example of a state transition in a video/audio playback apparatus according to the second embodiment of the present invention. The different point from the first embodiment is the playback of the Content Object is continued after the detection of the disconnection of the local storage during the playback executing at step S3, the suspend (step S31), the invoke of the pseudo file system (step S32), and the processing of the reconfiguration request flag ON (step S18). This is because all data recorded in the local storage 7 is protected by backing up in the RAM 4 as the pseudo file system at step S30 and therefore the playback can be continued by using each file of the pseudo file system recorded in the RAM 4.

On the other hand, although the pseudo file system is generated at step S30, it is not necessary to make the generated playback control information minimum as in the first embodiment and it is enough to copy a file in the local storage as it is. However, because in some cases, data in a plurality of the local storages are stored in the RAM 4, a file structure (e.g., including a directory path or an identification file) is adopted so that they can be discriminated by an ID of the USB memory being used as the local storage in advance or an organization ID or disc ID utilized for associating with the optical disc. As described above, by storing all data recorded in the local storage 7 in the RAM 4, the video/audio playback apparatus can capture and store the data generated in the local storage 7 in a system compatible for the present playback method such as another video/audio playback apparatus or a personal computer.

By the above-described configuration, even if the local storage 7 is unexpectedly electrically disconnected when the playback is executed using the virtual file system configured by virtually merging the optical disc 12 and the local storage 7, an image can be continuously played back.

Further, in the second embodiment, since the data structure of the pseudo file system stored in the RAM 4 is the same as the data structure in the local storage 7, the generation of the backup data may be implemented by copying the data and therefore the algorithm of generating the pseudo file system becomes simple.

Furthermore, since the backup data is identical to the original data, when the disconnection of the local storage 7 is detected, there is no necessity to replace data of the file expanded at a work area in the RAM 4, and there is also no necessity to change the data reference position because no replacement is needed and only the reference position information of the file is required to be changed, a response to the disconnection of the local storage 7 can be made easily and quickly.

In the second embodiment, the assumption has been made that the backup designation of data of the local storage 7 is the RAM 4, it is not limited to the RAM. For example, it may be an HDD, a Flash ROM, a storage device on the network designation, or the like, the device type and medium type is not limited. Further, if the storage capacity is large, by continuously holding data recorded in the local storage and corresponding to the optical disc that has been played back, even when the optical disc is loaded again and there is no local storage, the data in the local storage can be played back.

In addition, even if the HDD has the data of the local storage, a portable medium such as a USB memory is used as the local storage and the data in the USB memory is newer than the data in the HDD, the newest data can be played back by this configuration.

What is claimed is:
1. A video/audio playback apparatus comprising:
a playback drive section reading first video/audio information and first playback control information from an information recording medium;
a connecting section, to which an external storage device storing second video/audio information and second playback control information is electrically connected;
a virtual file system section generating a virtual file system by merging the first video/audio information and the first playback control information with the second video/audio information and the second playback control information;
a video/audio information output section outputting video/audio information on the basis of the virtual file system;
a playback manager instructing generation and dispose of the virtual file system to the virtual file system section;
a pseudo file system generator generating pseudo file system on the basis of the second video/audio information and the second playback control information;
a storage section storing the pseudo file system; and
a disconnection detector detecting electrical disconnection of the external storage device from the connecting section;
wherein, when the disconnection detector detects that the external storage device is electrically disconnected, the playback manager issues a command to the virtual file system section so that the virtual file system section replaces the second video/audio information and the second playback control information as the virtual file system with the pseudo file system, thereby reconfiguring the virtual file system.

2. The video/audio playback apparatus according to claim 1, wherein the pseudo file system includes files each having the same name as any file of the second video/audio information and the second playback control information.

3. The video/audio playback apparatus according to claim 2, wherein a file that is included in the pseudo file system and has the same name as the second video/audio information, has the same format as the second video/audio information, and has a playback time length shorter than a playback time length of the second video/audio information.

4. The video/audio playback apparatus according to claim 3, wherein the playback time length is 0.

5. The video/audio playback apparatus according to claim 2, wherein a file that is included in the pseudo file system and has the same name as the second video/audio information, has the same format as the second video/audio information, and has a playback time length being equal to a playback time length of the second video/audio information.

6. The video/audio playback apparatus according to claim 1, wherein the generating of the pseudo file system is performed for every referenced file of the second video/audio information and the second playback control information, said file being referenced when the video/audio playback apparatus is started up or when the external storage device is electrically connected to the connecting section.

7. The video/audio playback apparatus according to claim 1, wherein the generating of the pseudo file system is performed for a file, playback of which is requested, of files of the second video/audio information and the second playback control information that are stored in the external storage device.

* * * * *